United States Patent Office 3,541,445
Patented Nov. 17, 1970

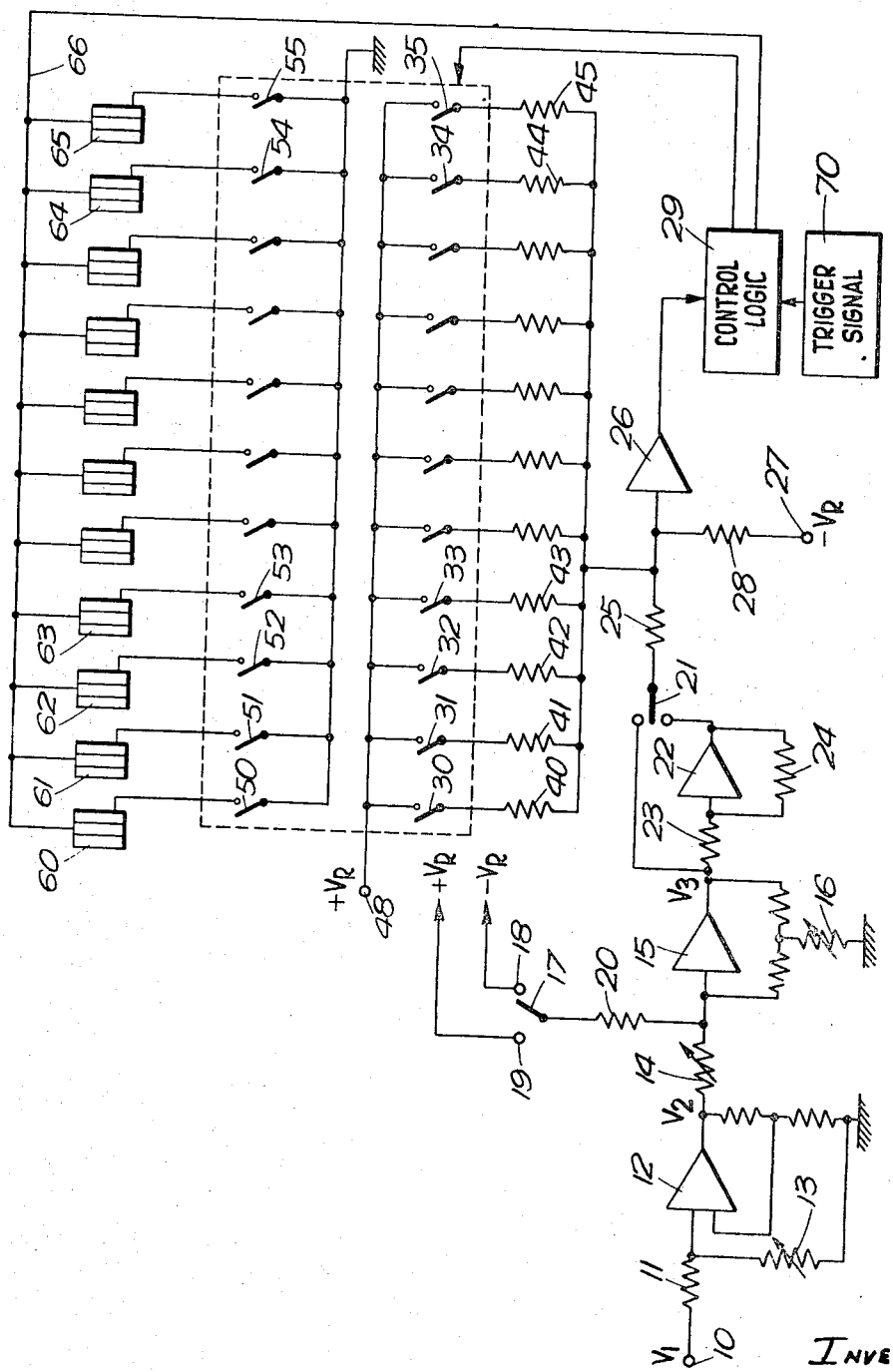

3,541,445
APPARATUS FOR STATISTICALLY CLASSIFYING AN ANALOGUE VOLTAGE
Ronald William Taylor and Adrian Gerald Morris, Hitchin, England, assignors to Datran Limited, Hitchin, Hertfordshire, England, a British company
Filed July 10, 1968, Ser. No. 743,891
Claims priority, application Great Britain, July 12, 1967, 32,155/67
Int. Cl. G01r *17/06;* H03k *5/20*
U.S. Cl. 324—99         13 Claims

ABSTRACT OF THE DISCLOSURE

Apparatus for classifying an analogue input voltage into one of a number of classes corresponding to different ranges of magnitude of the input voltage comprises a summing amplifier into which is fed an input current proportional to the input voltage, the amplifier having a plurality of input impedances switched sequentially into circuit and through which a reference voltage can provide a comparison current input to the summing amplifier, the change of polarity of the output of the summing amplifier due to the comparison current through the input impedance switched into circuit becoming larger than or becoming smaller than said input current as an input impedance is switched into circuit effecting operation of an appropriate one of a number of output indicator circuits.

BACKGROUND OF THE INVENTION

Field of the invention

This invention relates to apparatus for statistically classifying an analogue voltage. For many purposes, in examining the behaviour of a variable statistically, it is necessary to divide the expected range of variation of the variable into a number of intervals, called classes, and to allocate each of a set of measurements to the appropriate class. By counting the number of measurements in each class, the frequency distribution and hence statistical data about the set can be obtained.

As is well known, by the use of appropriate transducers, many quantities can be transformed into an analogue voltage having a magnitude representative of the magnitude or some other quantity of a physical variable. Hence, whilst the apparatus to be more particularly described later makes use of an analogue voltage input, by the use of appropriate transducers, it can be utilized for the classifying of other physical variables.

Prior art

Heretofore it has been the practice to effect classification of analogue quantities by the use of amplitude gate systems in which, for each class, a pair of amplitude sensitive gates define the upper and lower limits of signals to be accepted in that class. These systems however suffer from the drawback that a signal at the border line between two classes may be accepted by the gates for both classes or missed by both classes instead of being accepted in one class only. Thus not only is one of the classification counts wrong but also the total of the counts in all the classes is not the same as the actual number of signals to be classified.

SUMMARY OF THE INVENTION

According to the present invention, apparatus for classifying an analogue input voltage into one of a number of classes comprises comparison means for comparing the input voltage, or a signal having a magnitude related to that of the input voltage, with a comparison signal which is increased or decreased in successive steps corresponding to the various classes, said comparison means providing an output when the comparison signal reaches the value corresponding to the class in which the input voltage falls. It will be seen that with this sequential comparison, every input voltage must fall into one and only one class. This avoids the problems which occur with amplitude gate systems such as have been used heretofore in that, at the border line between two classes, a signal may be counted in two adjacent classes or may be missed.

In a preferred form of construction, apparatus for classifying an analogue input voltage into one of a number of classes corresponding to different ranges of magnitude of the input voltage comprises a summing amplifier, means for feeding to the input of the summing amplifier a current (referred to as the input current) proportional to the analogue input voltage, a plurality of alternative input impedances through which a reference voltage can provide a comparison current input to the summing amplifier, a stepping switch for connecting the various alternative input imepdances into circuit with the summing amplifier in succession, a plurality of output indicator circuits and means responsive to the change of polarity of the output of the summing amplifier due to the comparison current through the input impedance switched into circuit becoming larger than or becoming smaller than said input current as an input impedance is switched into circuit arranged to operate the appropriate output indicator circuits corresponding to the position of the stepping switch. It will be seen that, with this system, in effect the successive ranges of the magnitude of the variable are scanned and an output indication is given as soon as it is found into which class the magnitude falls. In such an arrangement, preferably the two end classes are both open-ended that is to say the class for the lowest magnitude has to include all magnitudes up to a predetermined value whilst, at the other end of the range, the class for the maximum amplitude counts all values above a predetermined level.

It is convenient to use direct voltages and to employ resistors as the input impedances of the summing amplifier. With a direct current system, the reversal of polarity of the summing amplifier may be sensed to determine when the stepping switch has reached the position corresponding to the appropriate class. It is possible however to use alternating current and employ a phase sensitive detector.

It is convenient to apply the input signal to be classified to the summing amplifier through an operational amplifier, referred to as the input operational amplifier, having an adjustable feedback resistance whereby the relationship between the output voltage from this input operational amplifier and the input voltage can be controlled. Preferably an intermediate operational amplifier is provided between the input operational amplifier and the summing amplifier and in this case the input operational amplifier issued to bring the input voltage to a suitable predetermined level. The intermediate operational amplifier can then have adjustable controls calibrated in terms of, e.g., in percentages of, the selected centre value of the input variable. This intermediate operational amplifier preferably has an adjustable input impedance and also has means for feeding in a predetermined current. By feeding in this predetermined current, the output from the intermediate operational amplifier may be made zero at the centre point of the range to be classified. Adjustment of the feedback impedance across this operational amplifier enables the class width to be adjusted without altering the centre point of the range. This adjustment might alternatively be made by adjusting an impedance through which the output of the intermediate operational amplifier is fed to the summing amplifier to produce the aforesaid input current for the summing amplifier. The centre point of the range can be adjusted by adjustment of an impedance in the input to the intermediate operational amplifier from the input operational amplifier. As will be explained later, by adjusting the centre point and the class width in this way, the class width can be selected as a fractton of the voltage at the centre point and the class width control can be calibrated directly in terms of this fraction.

An inverter may be provided with switch means for connecting the inverter in circuit between the intermediate operational amplifier and the output summing amplifier when required and for simultaneously reversing the polarity of the reference current fed into the intermediate operational amplifier so that the polarity of the input system can be reversed.

In adjusting the resistors in the various operational amplifiers, it is convenient to use switchable resistors giving stepwise adjustment.

The aforementioned stepping switch conveniently comprises a sequential switching system formed of electronic switches which may be operated by a shift register. Conveniently the sequential switching is stopped when the appropriate class has been reached and means are provided, which are operative whilst the sequential switching is stopped, to advance the appropriate counter by one unit. The appropriate counter may be selected by providing a second set of electronic switches operated in synchronism with those forming the aforementioned stepping switch. Subsequently the scanning cycle of the sequential switching is restarted.

Means may be provided for effecting the sequential switching repetitively at regular intervals so as to obtain regular sampling of an input voltage. Alternatively the sequential switching may be triggered by a suitable trigger signal each time sampling is to occur; such an arrangement may be employed when the voltage to be sampled occurs intermittently. Provision may be made for adjusting the rate of sampling when it is effected repetitively and provision may also be made for effecting the sampling under manual control for example by providing a press button switch which has to be operated each time the variable has to be sampled.

BRIEF DESCRIPTION OF THE DRAWING

The accompanying drawing is a diagram illustrating one construction of classifier constituting one embodiment of the invention.

DESCRIPTION OF THE PREFERRED EMBODIMENT

Referring to the drawing an input signal in the form of an analogue direct voltage representing a variable to be classified is applied to an input terminal 10 and is fed through an input resistor 11 to an operational amplifier 12 having an adjustable impedance 13 in the feedback network. This adjustable impedance conveniently comprises a number of resistors selectively switchable into circuit. The output from the amplifier 12 is fed through an adjustable resistor 14 into the input of an intermediate operational amplifier 15 having an adjustable feedback resistance network 16. This amplifier 15 also serves as a summing unit to add in a direct current reference signal. This reefrence signal is either positive or negative according to the position of a switch 17 which connects either a negative terminal 18 or a positive terminal 19 to the input of the amplifier through input resistor 20. This switch 17 is ganged with a further switch 21 enabling an inverter amplifier 22 with an input resistor 23 and feedback resistor 24 to be connected into the output circuit of the amplifier 15. Thus the output of the amplifier 15 may be obtained either directly or after inversion and this is fed through a resistor 25 into the input of a summing amplifier 26. A reference signal is also fed into this summing amplifier 26 from a source 27 via a resistor 28. Conveniently the source 27 is the same potential as terminal 18. The output of the summing amplifier 26 is fed to a control logic circuit 29 which senses the change of polarity of this output. The control logic circuit controls the operation of a stepping switch constituted by a series of electronic switches. Switches 30 to 35 are shown in the drawing and these operate sequentially, the sequential operation stopping as soon as the output of the amplifier 26 changes polarity. The switches 31 to 35 control the connection of further input resistors 41 to 45 in the circuit of the amplifier 26. These switches connect a direct voltage source 48 to the selected resistor to feed a direct current into the amplifier 26 having a magnitude dependant on the magnitude of the selected resistors 41 to 45. The voltage source 48 is conveniently the same potential as terminal 19. The switch 30 corresponds to an open ended class and has to give an infinite resistance when closed. The switch 30 therefore can be omitted when the first class is open-ended. As will bede scribed later, there is a further set of switches 50 to 55 ganged with switches 30 to 35 and there is therefore a step in the switching sequences corresponding to the switch 30 even if the latter is not provided. It is convenient therefore in the description to refer to the switch 30. in describing the sequential operation of the switches.

It will be apparent that the output of the amplifier 26 will change polarity when the input current from one of the resistors 41 to 45 exceeds the algebraic sum of the other input currents through resistors 25 and 28. As mentioned above, ganged with the switches 30 to 35 are a second series of switches 50 to 55. These control indicators 60 to 65. These indicators are electromagnetic counters and they do not receive any input during the normal switching sequence. The control logic circuit 29 however is arranged, when the switching sequence is stopped, to maintain the appropriate one of the switches 50 to 55 closed and to apply simultaneously an operating voltage on a line 66 to all the counters. The circuit for one only is completed through the closed switch so that only the appropriate one of the counters is operated corresponding to class identified by the switches 30 to 35 at which the polarity of the output of the amplifier 26 changes.

The device thus far described operates in the following manner. The input amplifier 12 converts the input signal $V_1$ at terminal 10 to a suitable level $V_2$ and the gain of this input amplifier can be set by adjustment of the feedback resistor 13 which constitutes a range control.

The intermediate operational amplifier 15 has an output voltage $V_3$ which is given by the expression $$V_3 = \left(\frac{V_2}{R_1} - \frac{V_R}{R_2}\right) R_3 \quad (1)$$

where $R_1$ is the magnitude of resistor 14
$R_2$ is the magnitude of resistor 20
$R_3$ is the effective resistance of the feedback network 16
$V_R$ is the voltage at terminal 18 or 19 as appropriate.

Hence the current $I_m$ into the summing amplifier 26 through resistor 25 is given by $$I_m = \left(\frac{V_2}{R_1} - \frac{V_R}{R_2}\right) \frac{R_3}{R_4} \quad (2)$$

where $R_4$ is the magnitude of the resistor 25.

The switches 30 to 35 and 50 to 55 are preferably arranged to provide an odd number of steps and it will be assumed that the number of steps is N. Resistors 41 to 44, corresponding to steps 2 to $N-1$ are arranged to give increases of current into the amplifier 26 of an equal amount with each step. This input current is made zero at step 1 and at step N it is made sufficiently large to exceed any possible combination of input currents through the resistors 25 and 28. The apparatus is set up so that the input current through the resistor 28 is equal to the current at step $$\frac{N-1}{2}$$ (5)

plus half the current increase per step. This current $I_q$ is therefore equal to the centre of the range scanned by the switch resistors from step 2 to step $(N-1)$. The switching sequence stops when the input current via the resistors 41 to 45 exceeds the combined input current through the resistors 25, 28. The step at which this occurs is determined by the current through the resistor 25 which is related to the input voltage as set out in Equation 2 above.

The current $I_q$ through the resistor 28 is equal to the centre of the range of currents defining the class edges 2 to $(N-1)$. Hence if the output voltage $V_2$ of the input amplifier 12 is such that $I_m$ equals 0, this voltage corresponds to the centre of the set of classes defined by the switched resistors 41 to 45. If this value of $V_2$ is $V_c$, then $$V_c = V_R \frac{R_1}{R_2} \quad (3)$$

Hence $R_1$ may be used to set the centre value of the histogram represented by the counter outputs.

The change $\Delta V_2$ in $V_2$ required to correspond to the current increase $\Delta I$ per step or class edge is given by $$\Delta I = \frac{\Delta V_2}{R_1} \cdot \frac{R_3}{R_4} \quad (4)$$

or $$\Delta V_2 = \Delta I \frac{R_1 R_4}{R_3} \quad$$

but $$R_1 = \frac{R_2 V_c}{V_R} \quad (5)$$

and therefore $$\Delta V_2 = \Delta I \frac{R_2 R_4}{V_R V_3} V_c \quad (6)$$

Thus adjustment of $R_3$, the feedback impedance of the intermediate operational amplifier 15, enables the class width $\Delta V_2$ to be selected as a fraction of $V_c$.

$R_3$ is preferably adjusted by a multiposition switch calibrated to give an indication in each switch position of $\Delta V_2$ as a percentage of $V_c$. Typically five positions might be provided giving percentages between say 0.1% and 5% or 10%.

It will be noted from Equation 3 that the centre value $V_c$ is linearly proportional to $R_1$. It may often be required to effect relatively fine adjustments of the centre value and typically therefore three sets of resistances are provided in series, each set being separately switchable adjustable enabling any resistance in a range from 001 to 999 times the magnitude of the datum to be selected. By setting the centre of the histogram to correspond to zero value of $I_m$, that is by not applying any input to resistor 20, the resistor $R_1$ may be used to control the class width.

The classifier described with reference to the drawings provides, on the indicators 60 to 65, indications corresponding to a histogram type display showing the frequency distribution of sampled values of a variable. Sampling is effected by applying a trigger signal to the logic unit 29. For repetitive sampling, such signals are provided by trigger signal generator 70. This may contain an oscillator so that the sampling may be effected repetitively at a predetermined frequency rate, which may be adjustable. Alternatively a trigger pulse is supplied when sampling is to be effected, e.g., when a sampling is permissible, or triggering may be done manually.

The classifier may also very conveniently be used for classifying a variable for a continuously updated histogram display such as that described in copending application No. 28,489/67.

We claim:

1. Apparatus for classifying an analogue input voltage into one of a number of measurement classes comprising:
    a first adjustable voltage scaling means for determining a center point value and providing a scaled voltage which is linearly proportional, in an adjustable ratio, to said analogue input voltage,
    a reference voltage source,
    a second adjustable voltage scaling means for determining class width and responsive to the difference between the voltage from said reference voltage source and said scaled voltage from said first adjustable voltage scaling means, said second voltage scaling means providing an intermediate voltage output linearly proportional in an adjustable ratio to the difference between its inputs,
    a stepping switch,
    a plurality of output indicator circuits,
    circuit means controlled by said switch for providing a comparison signal changed in amplitude in successive steps,
    comparison means for comparing said intermediate voltage with said comparison signal and for providing an output when the comparison signal steps to a value where it changes polarity with respect to the intermediate voltage, and
    means controlled by said stepping switch for applying said output from said comparison means to an indicator-circuit selected in accordance with the position of the switch.

2. Apparatus for classifying an analogue input voltage into one of a number of measurement classes corresponding to different ranges of magnitude of the analogue input voltage, said apparatus comprising:
    an input operational amplifier for determining a center point value and amplifying said analogue input voltage, said input operational amplifier having an adjustable resistance to provide an output voltage linearly related to the input voltage in an adjustable ratio,
    an intermediate operational amplifier for determining class width and having an adjustable input impedance to which impedance is applied the output voltage from said input operational amplifier,
    said intermediate operational amplifier further having an adjustable feedback impedance,
    means for additionally feeding into said intermediate operational amplifier a predetermined current,
    a summing amplifier,
    means for feeding to the input of the summing amplifier an input current from said intermediate operational amplifier,
    a plurality of alternative input impedances through which a reference voltage can provide a comparison current input to the summing amplifier,
    a stepping switch arranged to connect the various alternative impedances into circuit with the summing amplifier in succession,
    a plurality of output indicator circuit, and
    means responsive to the change of polarity of the output of the summing amplifier, due to the comparison current through the input impedance switched into circuit becoming larger than or becoming smaller than said input current as an input impedance is switched into circuit, arranged to operate the appropriate output indicator circuit corresponding to the position of the stepping switch.

3. Apparatus as in claim 2 wherein the adjustable input impedance of said intermediate operational amplifier has a control calibrated in terms of the selected value of the input variable.

4. Apparatus as claimed in claim 2 wherein said input voltage is a direct voltage and where said input impedances are resistors.

5. Apparatus as claimed in claim 4 wherein the means responsive to the change of polarity of the output of the summing amplifier comprises direct current polarity sensing means.

6. Apparatus as claimed in claim 2 wherein said input voltage is an alternating voltage and wherein the means responsive to the change of polarity of the output of the summing amplifier comprises a phase sensitive detector.

7. Apparatus as claimed in claim 2 wherein the output from said intermediate operational amplifier is fed into the summing amplifier through an adjustable impedance.

8. Apparatus as claimed in claim 2 wherein an inverter is provided with switch means for connecting the inverter in circuit between the intermediate operational amplifier and the summing amplifier when required, said switch means being arranged simultaneously to reverse the polarity of the reference current fed into the intermediate operational amplifier.

9. Apparatus as claimed in claim 2 wherein said stepping switch comprises a sequential switching system formed of electronic switches operated by a shift register.

10. Apparatus as claimed in claim 9 wherein the output indicator circuits comprise counters with count indicators and wherein there are provided means for stopping the sequential switching when the appropriate class has been reached and means which are operative whilst the sequential switching is stopped to advance the appropriate counter by one unit.

11. Apparatus as claimed in claim 2 wherein means are provided for effecting the sequential switching repetitively at regular intervals.

12. Apparatus as claimed in claim 2 wherein means are provided for starting the sequential switching by application of a trigger signal when sampling is required.

13. Apparatus for classifying an analogue voltage into one of a number of classes corresponding to the different ranges of magnitude of the analogue input voltage, said apparatus comprising:

an input operational amplifier for amplifying said analogue input voltage to provide an output voltage linearly proportional to said analogue input voltage, said input operational amplifier having an adjustable resistance whereby the relationship between the input voltage and the output voltage is controlled, an intermediate operational amplifier fed from the output of said input operational amplifier, a reference current source providing alternatively reference currents of opposite polarity, means for feeding into said intermediate operational amplifier a current from said reference current source, a summing amplifier fed from said intermediate operational amplifier, an inverter with switch means for connecting the inverter in circuit between the intermediate operational amplifier and the summing amplifier when required, said switch means being arranged simultaneously to reverse the polarity of the reference current fed into the intermediate operational amplifier.

the polarity of alternative input impedances through which a reference voltage can provide a comparison current input to the summing amplifier, a stepping switch arranged to connect the various alternative impedances into circuit with the summing amplifier in succession, a plurality of output indicator circuits, and means responsive to the change of polarity of the output of the summing amplifier due to the comparison current through the input impedance switched into circuit becoming larger than or becoming smaller than said input current as an input impedance is switched into circuit arranged to operate the appropriate output indicator circuit corresponding to the position of the stepping switch.

References Cited

UNITED STATES PATENTS

| | | | |
|---|---|---|---|
| 2,870,408 | 1/1959 | Draganjac | 324—99 XR |
| 2,880,392 | 3/1959 | Paulsen | 324—99 XR |
| 2,972,126 | 2/1961 | Hecox et al. | 324—99 XR |

RUDOLPH V. ROLINEC, Primary Examiner

E. F. KARLSEN, Assistant Examiner

U.S. Cl. X.R.

328—116; 340—172